United States Patent [19]

Yano

[11] Patent Number: 4,591,920
[45] Date of Patent: May 27, 1986

[54] PASSIVE IMPLEMENT FOR CONVERTING A TELEVISION RECEIVER TO AN OPTICAL-ART DISPLAY

[76] Inventor: Toyohiko Yano, 3-19-4 Akasaka, Minato-Ku, Tokyo 107, Japan

[21] Appl. No.: 543,765

[22] Filed: Oct. 20, 1983

[51] Int. Cl.$^4$ .............................................. H04N 5/72
[52] U.S. Cl. ..................... 358/250; 358/253; 358/249; 40/442; 40/579
[58] Field of Search ............... 358/250, 253, 254, 251, 358/252, 255, 245, 246, 247, 248, 249; 350/311, 168, 266; 40/442, 443, 444, 579, 597

[56] References Cited

U.S. PATENT DOCUMENTS

| | | | |
|---|---|---|---|
| 2,690,554 | 9/1954 | Wolf | 358/253 |
| 3,014,724 | 12/1961 | Cryder et al. | 358/305 |
| 3,418,426 | 12/1968 | Schlegel et al. | 358/252 |
| 3,561,850 | 2/1971 | Shaffer | 358/253 |
| 3,627,926 | 12/1971 | Nichols | 358/253 |
| 3,646,266 | 2/1972 | Hassell | 358/253 |
| 3,657,474 | 4/1972 | Turnrose | 40/444 |
| 3,849,598 | 11/1974 | Hoffberger, II et al. | 358/255 |
| 4,097,902 | 6/1978 | Curnuck | 358/255 |
| 4,204,231 | 5/1980 | Permenter | 358/247 |
| 4,354,205 | 10/1982 | Lowe et al. | 358/250 |
| 4,354,739 | 10/1982 | Scanlon et al. | 358/253 |
| 4,357,771 | 11/1982 | Olds | 40/444 |

Primary Examiner—James J. Groody
Assistant Examiner—John K. Peng
Attorney, Agent, or Firm—Albert O. Cota

[57] ABSTRACT

A passive implement for converting a television receiver to an optical art display. The implement is comprised of a perforated-art panel having a multiplicity of apertures where the apertures, in combination, depict an artistic scene. The panel is attached near the screen of a color television receiver. The television is then turned on and the audio level is turned to zero. The colors produced by the video programs, which are visible through the apertures in the panel, produce an optical art display that is continuously changing in color intensity and color variety. When the optical art display is viewed with complimentary music, a pleasurable room mood is created.

7 Claims, 9 Drawing Figures

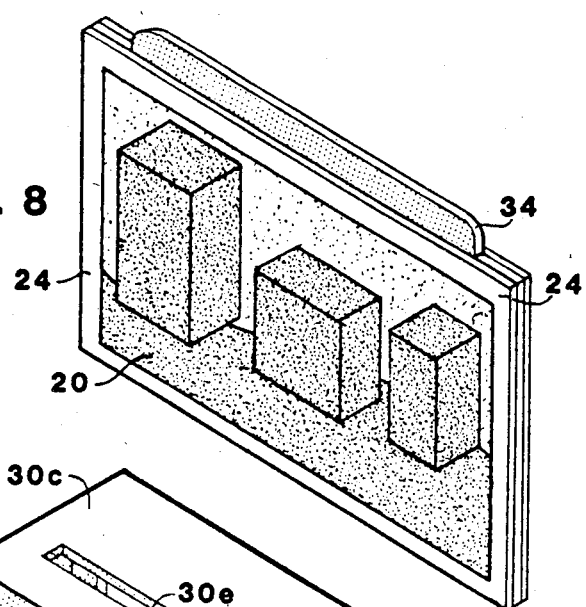
FIG. 8
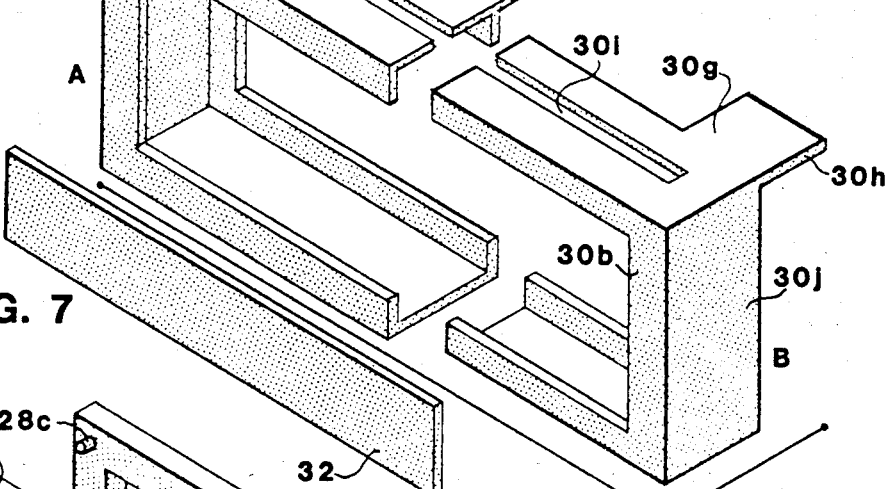
FIG. 7
FIG. 6
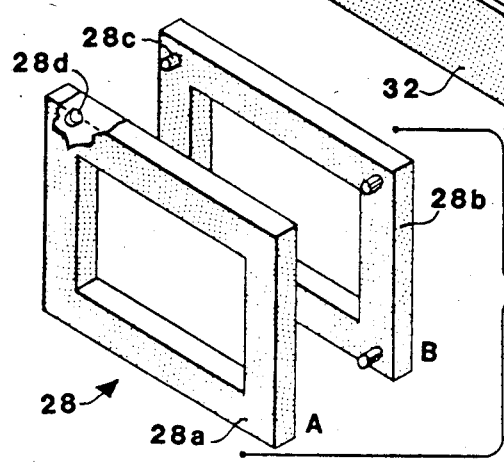
FIG. 9

PASSIVE IMPLEMENT FOR CONVERTING A TELEVISION RECEIVER TO AN OPTICAL-ART DISPLAY

TECHNICAL FIELD

This invention pertains to the general field of optical art and more particularly to a back-lighted perforated-art panel that is subjected to a dynamic light source when attached near the surface of a television screen.

BACKGROUND ART

The instant invention is an improvement over the applicant's inital Japanese patent application, Ser. No. 106905, filed 30 July 1980 and entitled "Decorative Light Shielding Plate". No priority claim is made of the initial patent application which is currently in the patent pending phase in Japan.

The utility of a television receiver need not be covered or explained. However, to use a television receiver for other than its intended purpose is considered novel. In the case of the instant invention, the television receiver is used as the sole source of dynamic light for use with an optical-art display comprised of a passive perforated-art panel. In a literature search of optical art, no reference was made to the use of a television receiver for the source of light.

Optical art is generally characterized by the use of straight or curved lines or geometric patterns to achieve an illusory effect of motion. Most, if not all, optical art displays consists of a combination of elements where one element, is a non-dynamic light source that back-lights a revolving artistic scene to create an illusion of movement.

DISCLOSURE OF THE INVENTION

The invention is comprised of a passive implement consisting of a thin piece of rigid material onto which a line drawing of an artistic scene is drawn or transferred. The material is then artistically perforated by an artist with a multiplicity of apertures where the apertures, in combination, depict the original artistic scene to create a perforated-art panel. To prevent damage to the panel it is laminated between two pieces of clear plastic, such as a polyethylene film to form a laminated perforated-art panel.

The laminated panel is designed to be attached near the screen of a color television receiver. When the television is turned-on, the light emitted from the television screen leaks through the apertures in the panel. The variation in color and color intensities produced by the television video produces a dynamic optical-art display that creates a pleasant room mood. The room mood may be further enchanced when the television audio is turned to zero and the panel is viewed with complimentary background music.

Several methods are disclosed for attaching the laminated perforated-art panel near the screen of the television receiver. The preferred method employs an adjustable perforated-art holder. The holder includes a mounting slat that allows the holder to be easily and quickly attached to the television cabinet without having to make any type of modifications or additions to the television. Once the holder is adjusted and attached to the television cabinet the laminated art panels can be easily inserted and removed to create a variety of room moods.

In addition to providing an invention that easily converts a television receiver to a dynamic optical-art display and room mood creator, it is also an objective of the invention to provide an implement that:

○ can be easily and cost-effectively manufactured,
○ is reliable and requires no maintenance, and
○ increases the utility value of a television receiver.

BEST DESCRIPTION OF THE DRAWINGS

The details of the invention are described in connection with the accompanying drawings in which:

FIG. 6 is an exploded perspective view of the adjustable perforated-art panel holder.

FIG. 7 is a perspective view of the screening slat that may be used with the adjustable perforated-art panel holder.

FIG. 8 is perspective view of a laminated perforated-art panel having a pull tab attached to the top of the panel.

FIG. 9 is an exploded perspective view of the panel frame assembly.

BEST MODE FOR CARRYING OUT THE INVENTION

The invention 10 is comprised of a passive implement that when used in combination with a television receiver a mood-setting optical-art display is produced.

Figure 1:
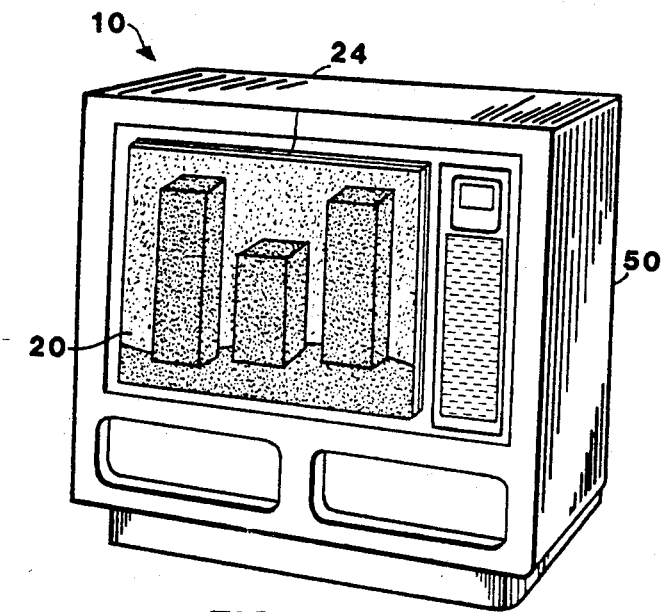
FIG. 1 is a perspective view of a television receiver converted to an optical-art display by having a laminated perforated-art panel attached near the television screen.
Figure 2:
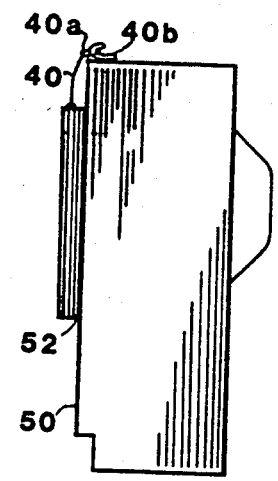
FIG. 2 is a side view of a television receiver having a laminated perforated-art panel attached by means of an elastic band having a ring that is hooked to a hook attached to the television cabinet.

The best mode for carrying out the invention 10 is presented in terms of a basic perforated-art panel 12 and the several methods available for attaching the panel near the surface of the television receiver screen 52 as shown in FIGS. 1 and 2. Particular emphasis is placed on an adjustable perforated-art panel holder 30 that attaches to a television receiver and allows laminated perforated-art panels 24 to be easily changed to create a variety of room moods.

Figure 3:
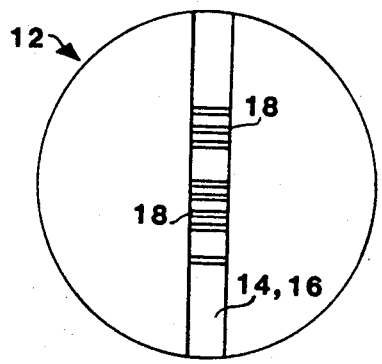
FIG. 3 is a sectional side view of a basic perforated-art panel.

The basic perforated-art panel 12, as shown as a side view in FIG. 3, is comprised of either a thin panel of metal 14 such as aluminum foil, a photographic film 16, a thin piece of cardboard or any thin non-resilient material. If a single art-panel is to be created, the aluminum foil is most practical. However, if the panel 12 is to be mass produced, it is preferable that a photographic process be employed that ultimately results in the production of a panel 12 on photographic film 16. The photographic process is described infra. Whatever the panel material, it is first necessary that an artist lay-out or transfer an artistic scene 20 on the panel 12 and artistically perforate the panel with a pin or stylus to create a multiplicity of apertures 18 where the aperatures, in combination, depict the artistic scene 20.

When the completed panel 12 is placed in front of a light source, the light leaking through the multiplicity of apertures 18 lights the artistic scene 20 as shown in FIGS. 1 and 8. The scene is further enhanced and a pleasurable room mood is created when the panel 12 is attached near the screen 52 of a color television receiver 50 as also shown in FIGS. 1 and 2. Under this condition, a dynamic optical-art display is produced each time the television video changes scene and/or color patterns. Further enhancement may be achieved by turning down the television audio to zero, dimming the room lights and turning-on a source of complimentary music.

Figure 4:
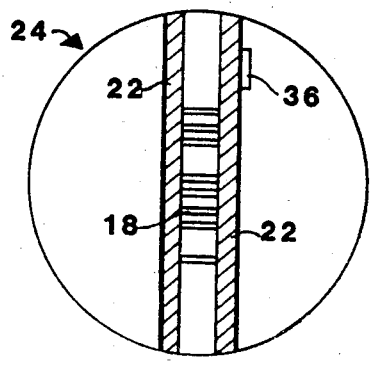
FIG. 4 is a sectional side view of a laminated perforated-art panel having double-sided sticky tape attached to the backside.

To prevent damage to the perforated-art panel 12 and the apertures 18, the basic panel material is preferably covered by a clear plastic shield 22 to form a laminated perforated-art panel 24 as shown in FIG. 4. The shield may be made of any clear plastic with a polyethylene laminating film preferred. The thickness of the shield may also vary to allow either a flexible or rigid laminated panel to be produced. Hereinafter the laminated perforated-art panel 24 will be referred to in the specification in lieu of the basic perforated-art panel 12.

Figure 5:
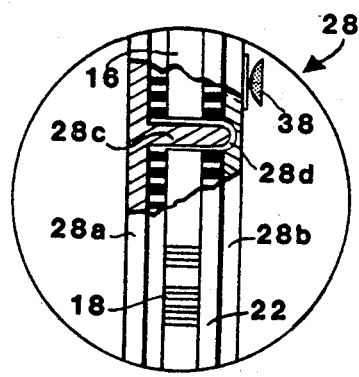
FIG. 5 is a sectional side view of a laminated perforated-art panel enclosed within a panel frame assembly where the back of the assembly is equipped with suction cups.

An additional panel 24 mounting method may be used that utilizes a panel frame assembly 28, as shown in FIGS. 5 and 9, comprised of a front frame member 28a and a back frame member 28b. The backside of the front frame member has a pin 28c located in each corner, as best shown in FIG. 9A. The frontside of the back frame member 28b has an equal quantity of compatible press-fit pin bores 28d as best shown in FIG. 9B.

To use the panel frame assembly 28, a panel 24 is first punched with holes corresponding to the pins 28c in the assembly 28. The panel is then placed between the two frame members 28a, 28b and the two frames are press-fitted together to hold the panel firmly in-place.

The attachment of the laminated perforated-art panel 24 to the television screen 52 may be accomplished in a number of ways. However, the preferred method is to insert the panel 24 into an adjustable perforated-art panel holder 30 as shown in FIG. 6.

The holder is comprised of two sections: a stationary frame member 30a and a sliding frame member 30b.

The stationary frame member 30a, as shown in FIG. 6A is configured in the shape of contiguous square-C where each section of the frame member has a channel configuration. The inward side, that is the side facing the television receiver, of the stationary upper section 30c has a first horizontal support ledge 30d that extends the length of the stationary upper section. The stationary upper section 30c also has on its top side a first slot 30e that extends from the vertical side 30f of the stationary frame member all the way through to the end of the stationary upper section 30c.

The sliding frame member 30b, as shown in FIG. 6B, is configured in the shape of a contiguous reverse square-C where each section of the frame member has a channel configuration. The channel sections of the sliding frame member 30b are dimensioned to allow the open end of the sliding frame member to slideably fit into the open end of the stationary frame member 30a. Thus, when the two members 30a, 30b are joined the horizontal length of the adjustable art-panel holder can be adjusted. The inward side of the sliding upper section 30g has a second horizontal support ledge 30h that extends about one-fourth the distance from the closed end of the sliding upper section 30g. The sliding upper section also has a second slot 30i that is dimensioned to match the first slot 30e in the stationary frame member.

The second slot 30i extends from the vertical side 30j of the sliding frame member 30b all the way through to the end of the sliding upper section.

To use the adjustable perforated-art panel holder 30, it is simply adjusted by holding the stationary frame member 30a with one hand and sliding the sliding frame member 30b with the other hand to a length that frames the horizontal length of the television screen 52. The support ledges 30d, 30h are then placed over the cabinet top of the television receiver 50 to maintain the holder in place. Once the holder 30 is in place a laminated panel 24 is selected and inserted into the slots 30e, 30i. The holder will retain the panel for viewing and allow changing panels with a minimum of effort. Additionally, when the use of a panel is not desired, the holder 30 may remain attached to the television receiver 50 without affecting normal television viewing.

The adjustable art-plate holder 30 may be constructed of plastic, wood or metal with a plastic polypropylene or polyethylene material preferred because of its commercial cost-effective manufacturing capability. The plastic holder may also be manufactured in a variety of colors and/or textures.

To assure a "one size fits all" design for the adjustable perforated-art panel holder 30, the holder may come equipped with a supplementary screening slat 32. The slat 32 as shown in FIG. 7, would be used in those cases where the vertical opening of the holder 30 is too large for a particular television screen. If the screening slat 32 is required, it is cut to fit into the inside corners of the assembled upper and/or lower sections of the holder 30 and it is then attached by an adhesive.

To facilitate the insertion and removal of the panel 24 into the slot 30e, 30i of the holder 30, the panel may be manufactured with a pull tab 34 extending upwardly from the top edge of the panel as shown in FIG. 8.

In addition to the preferred method of attaching the laminated panel 24 there are also other alternative methods. One such method is to apply to the edges of the backside of the panel 24, a readily available double-sided sticky tape 36 as shown in FIG. 4. The panel is then pressed against the television screen bezel or other cabinet structure surrounding the screen 52.

Another method that may be used to attach the panel is by using commercially available suction cups 38. In this method, the suction cups, as shown in FIG. 5, are attached by an adhesive to the back edges of the laminated panel 24 or panel frame assembly 28. The suction cups 38 are then pressed against a smooth surface of the television receiver 50.

A third panel 24 attachment means is accomplished by conventionally attaching an elastic band 40 to each upper corner of the panel 24. The other end of the elastic band has a conventionally attached ring 40a that hooks to a complimentary hook 40b that is attached by an adhesive to the television cabinet. The third attachment means is shown in FIG. 2.

As previously mentioned a commercially feasible optical-art display, using the perforated-art panel 12, may be produced by a photographic process that leads to the laminated panel 24. The process is as follows:

1. On a piece of thin artist board having a working area that is equal to the viewing area of a nineteen-inch television screen 52 create or transfer a line drawing of an artistic scene 20. A typical artistic scene would be the skyline of a large city.

2. With a pin or stylus the artist must then aesthetically perforate the artistic scene 20 to create a master perforated-art panel 12 consisting of a multiplicity of apertures 18. The apertures, in combination, now depict an optical-art form of the original artistic scene 20.

3. By a first photographic process that is well known in the art, make a photomaster of the master perforated-art panel 12.

4. By a second photographic process, also well known in the art, use the photomaster made in step 3 to reproduce on photographic film the desired quantity of perforated-art panels. In the final product the apertures 18 appear as clear areas whereas the surrounding area is dark.

5. Laminate the perforated-art panel 12 by placing it between two sheets of a clear plastic material, such as a polyethylene film, to produce the laminated panel 24.

Although the invention has been described in complete detail and pictorially shown in the accompanying drawings, it is not to be limited to such details, since many changes and modifications may be made to the Passive Implement for Converting a Television Receiver to an Optical-Art Display without departing from the spirit and scope thereof. Hence, it is described to cover any and all modifications and forms which may come within the language and scope of the claims.

I claim:

1. A passive implement for converting a television receiver to an optical-art display comprising:
   (a) a perforated-art panel having a multiplicity of apertures where said apertures, in combination, depict an artistic scene,
   (b) a television receiver having a television screen,
   (c) a panel frame assembly consisting of a front frame member and a back frame member where the frontside of the back frame member has a plurality of spaced pins and with the backside of the front frame member having an equal plurality and spacing of press-fit pin bores such that when said perforated-art panel is placed between the two frames and the two frames are press-fitted said panel is firmly held in-place, and
   (d) means for attaching said panel frame assembly near the surface of the television screen.

2. A passive implement for converting a television receiver to an optical-art display comprising:
   (a) a perforated-art panel having a multiplicity of apertures where said apertures, in combination, depict an artistic scene,
   (b) a television receiver having a television screen,
   (c) a panel frame assembly consisting of a front frame member and a back frame member where the frontside of the back frame member has a plurality of spaced pins and with the backside of the front frame member having an equal plurality and spacing of press-fit pin bores such that when said perforated-art panel is placed between the two frames and the two frames are press-fitted said panel is firmly held in-place, and:
   (d) a plurality of suction cups attached to the backside of the back frame member so that when said frame assembly is pressed against a surface of the television receiver said frame assembly remains positioned.

3. A passive implement for converting a television receiver to an optical-art display comprising:
   (a) a perforated-art panel having a multiplicity of apertures where said apertures, in combination, depict an artistic scene,
   (b) a television receiver having a television screen, and
   (c) an adjustable perforated-art panel holder comprising:
      (1) a stationary frame member configured in the shape of a contiguous square-C where each section is comprised of a channel configuration where the inward side of the stationary upper section has a first horizontal support ledge that extends the length of the stationary upper section and with the top side of the stationary upper section also having a first slot extending from the vertical side of said stationary frame member all the way through to the end of the stationary upper section,
      (2) a sliding frame member configured in the shape of a contiguous reverse square-C where each section is comprised of a channel configuration that is dimensioned to allow the open end of said sliding frame member to slideably fit into the open end of said stationary frame member such that when the two members are joined the horizontal length of said adjustable perforated-art plate holder can be adjusted, where the inward side of the slding upper section has a second horizontal support ledge that extends about one-fourth the distance from the closed end of the sliding upper section and with the top side of the upper sliding top section also having a second slot that matches the first slot in said stationary upper section and where the second slot extends from the vertical side of said sliding frame member all the way through to the end of the sliding upper section.

4. The adjustable perforated-art panel holder as specified in claim 3 further comprising a screening slat that is cut to fit into the inside corners of the assembled upper and/or lower portion of the panel, where said screen slat is attached by an adhesive after said holder is adjusted to fit a particular size television receiver.

5. The perforated-art panel as specified in claim 3 further comprising a pull tab extending upwardly from the top edge of said panel where said pull tab facilitates the insertion and removal of said panel from the slot in said adjustable perforated-art panel holder.

6. A method for producing a commercially feasible otpical-art display from a perforated-art panel where the steps comprise:
   (a) on a piece of artist board having a working area equal to the viewing area of a television screen create a line drawing of an artistic scene,
   (b) with a pin or stylus aesthetically perforate the artistic scene to create a master perforated-art panel consisting of a multiplicity of apertures where the apertures, in combination, now depict an optical-art form of the original artistic scene,
   (c) by a first photographic process make a photomaster of the master perforated-art panel,
   (d) by a second photographic process using the photomaster, reproduce on film the desired quantity of perforated-art panels where the apertures appear as clear areas and where the surrounding area is dark.

7. The method for producing said optical-art display as specified in claim 6 further comprising an additional step of laminating the perforated-art panel by placing it between two sheets of clear plastic to form a laminated panel.

* * * * *